Figure 1:
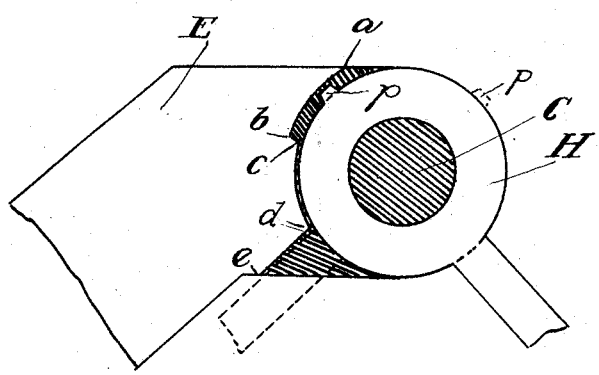
Figure 2:
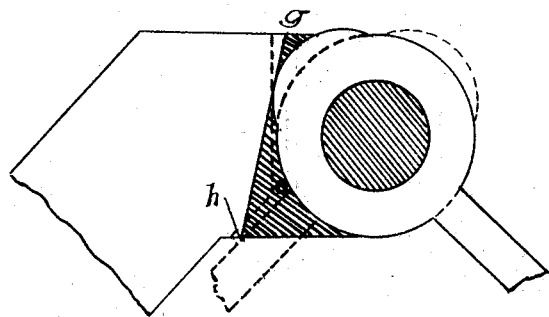

Feb. 28, 1933. J. VERRE 1,899,402
SPECTACLES TEMPLE
Filed Aug. 8, 1930

Inventor
John Verre

Patented Feb. 28, 1933

1,899,402

UNITED STATES PATENT OFFICE

JOHN VERRE, OF HOLLYWOOD, CALIFORNIA

SPECTACLES TEMPLE

Application filed August 8, 1930. Serial No. 473,994.

The kind of reversible temple and endpiece (or the hinging parts of the frame), for the temple to fit in, of this invention, is ready to be mounted on either side of the frame without any previous operation, cutting, filing, etc. being performed. Such a temple cannot fit on frames now on the market, but must be used in connection only with its own frames; it can, however, be transferred to the other side of the frame, without any previous operation, whenever it be necessary or desirable.

Referring to the drawing, Fig. I is a plan view of one form of my invention.

Fig. II is a plan view of another form of my invention.

Fig. (I) represents a reversible temple, mounted on its fitting end-pieces, in the open position; the broken line shows it folded; the compound line $abcde$ of the groove, following the contour of the temple, may be preferably substituted by a straight line $a'e$—, or by any other shape that permits the same freedom of movement of the temple.

The Fig. (II) shows the same temple, where the protuberance has widened and become one with the temple, which has assumed an oval shape; the line $gh$ shows the wall of the groove, which checks the turning movements of the temple, holding it within an angle of about 90°. The temple is here also shown in its two extreme positions, opened and folded. In this figure, when folded, a portion of the temple protrudes out of the jaws of the end-pieces of the frame; by making the jaws wider, the temple may, of course, be completely hidden.

I claim, therefore, as follows:

1. A temple connection for spectacles comprising an endpiece attached to the frame and extending rearwardly from the plane thereof, said rearwardly extending part having a horizontal slot therein, a curved bottom to said slot, a stop shoulder intermediate the ends of said bottom, a temple ear round in shape pivotally mounted in said slot on a pivot passing through its center line, said ear being symmetrical about said center line and having a protuberance at its innermost extremity, said protuberance being symmetrical about said center line, whereby said protuberance will ride in said bottom until it engages said stop shoulder.

2. A temple connection for spectacles comprising an endpiece attached to the frame and extending rearwardly from the plane thereof, said rearwardly extending part having a horizontal slot therein, a curved bottom to said slot, a stop shoulder intermediate the ends of said bottom, a temple ear oval in shape pivotally mounted in said slot on a pivot passing through its center line and having a protuberance at its innermost extremity, said protuberance being symmetrical about said center line, whereby said protuberance will ride in said bottom until it engages said stop shoulder.

3. A temple connection for spectacles comprising an endpiece attached to the frame and extending rearwardly from the plane thereof, said rearwardly extending part having a horizontal slot therein, a curved bottom to said slot, a stop shoulder intermediate the ends of said bottom, a temple ear pivotally mounted in said slot on a pivot passing through its center line, said ear being symmetrical about said center line and having a protuberance at its innermost extremity, said protuberance being symmetrical about said center line, whereby said protuberance will ride in said bottom until it engages said stop shoulder.

JOHN VERRE.